Patented Jan. 30, 1951

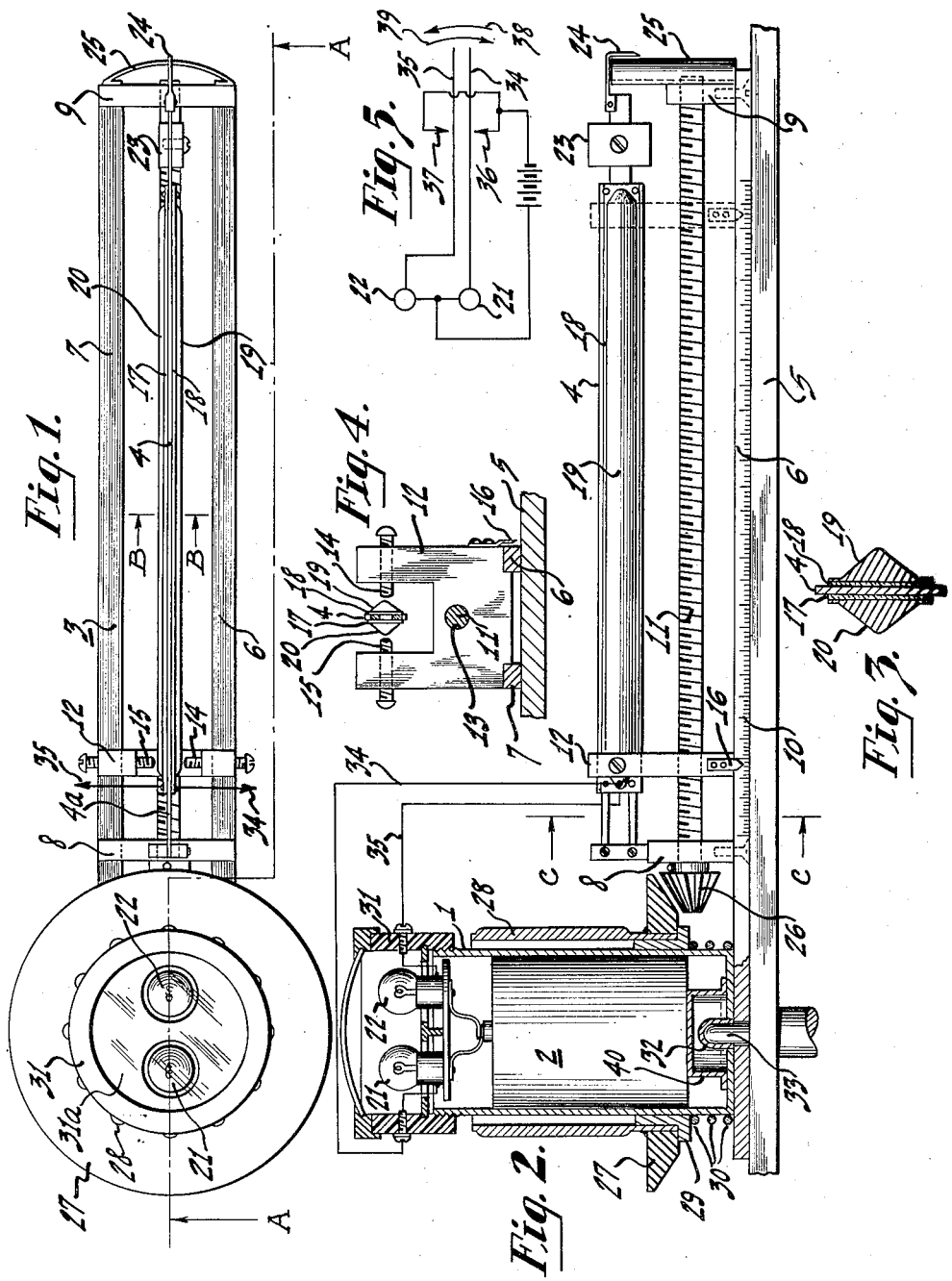

2,539,620

UNITED STATES PATENT OFFICE 2,539,620

MEASUREMENT OF SPEED DEVIATION

George K. Graham, Oceanside, N. Y., assignor to Radio Corporation of America, a corporation of Delaware Application April 17, 1946, Serial No. 662,676

7 Claims. (Cl. 264—11)

This invention relates to improvements in a method of and apparatus for measuring deviation in velocity of an object normally having a regular motion. More particularly, it relates to measuring deviation in rotational velocity of a regularly rotating object such as a record playing turntable but is not intended to be limited thereto.

It is frequently necessary to analyze the motion of a record playing turntable in order to correct operational faults. Where great accuracy of operation is desired, such as in transcription players used in radio broadcasting, any irregularity of rotation must be found and corrected if the turntable is to be continued in use. The same is true of turntables used in sound recording since any irregularity of motion results in corresponding undesirable deviations of the sound record. Faulty construction or worn bearings may result in slowing down of the rotational velocity during part of each revolution of the turntable. Other faults may cause a slight rise in speed during a portion of each revolution. Both faults may be present in the same device which complicates the measuring problem still more.

Devices such as stroboscopic counters enable one to accurately measure the rotational velocity of a turntable or other regularly rotating object and such devices will also indicate waver in the motion. However, neither the stroboscope nor other devices commonly used to calibrate velocity of rotation will indicate quantitatively the deviation in velocity which may be present at one or more parts of the rotational cycle.

One object of the present invention is to provide improved apparatus and a method which may be employed in detecting deviations in normal rotational velocity. Another object is to provide apparatus which may be used to measure quantitatively deviations in the rotational velocity of a rotating object. It is a further object to provide an apparatus and method for detecting faulty operation of a transcription turntable which may be used as a basis for correcting the faults. It is still another object to provide an apparatus for measuring deviations in rotational velocity which will give a positive visible indication of an increase or decrease from the normal velocity. In the broader aspects of the invention, it is an object to detect the extent and direction of deviations in the motion of any body having normally regular motion, whether that motion be rotational or not.

The invention will be better understood with the aid of the following description and the drawing of which:

Fig. 1 is a plan view of apparatus which may be utilized in making speed deviation measurements on a rotating object according to the present invention;

Fig. 2 is a cross section view of the apparatus of Fig. 1 taken partly along the line A—A and partly in perspective;

Fig. 3 is an enlarged detail view of a cross section of the flexible arm, only, taken along the line B—B;

Fig. 4 is a section view taken along the line C—C of Fig. 2;

Fig. 5 is a diagram of an indicator circuit which may be used in the present invention.

As shown in Figs. 1 and 2, a preferred form of the apparatus has a battery housing 1 carrying a battery 2 and is connected at its base to a frame 3 carrying a flexibly mounted arm 4. Housing and frame are adapted to rest on the surface of a rotating object such as a turntable 5. The frame has two channeled arms 6 and 7 connected together and held in parallel relationship by end members 8 and 9. One arm 6 of the frame carries a calibrated scale 10.

Between the parallel frame arms and mounted on bearings in end members 8 and 9 is a threaded rod 11. A slider 12 shown in more detail in Fig. 4 rests on channeled members 6 and 7 and has a threaded hole 13 through which threaded rod 11 is passed. This slider carries a pair of threaded metal contact points 14 and 15 electrically connected to each other and to one side of battery 2 through one or both of the channeled frame members and a raised contact plate. The slider also carries a pointer 16 which moves along the scale 10 attached to channeled member 6. Arm 4, which may have a flexible portion 4A, is connected to an upright extension of frame end member 8. The structure of the arm 4 is shown in more detail in Fig. 3. On either side of the arm and extending over a major portion of its length are thin insulating strips 17 and 18. Outside of the insulating strips are metal contact strips 19 and 20. These may be thick enough to lend rigidity to the portion of the arm which they cover. The metal contact strips are each connected to one of the electric lamps 21 or 22 which are in turn connected to the terminal of battery 2 opposite to that to which the contacts 14 and 15 are connected.

Near the outer end of the arm is carried a sliding weight 23 which may be positioned and held in place with the aid of a screw. At the extreme outer end of the arm is a pointer 24 moving across a scale 25 attached to the outer end of frame 3.

The inner end of threaded rod 11 has attached thereto a beveled gear 26. Another beveled gear 27 in opposed relation to gear 26 is mounted on the bottom edge of a knurled sleeve 28 which fits over the battery housing 1. The lower surface of gear 27 rests slidably on a channeled ring 29. The channeled member rests on a spring 30 which normally presses upward against gear 27 so as to keep it from engaging gear 26.

Protecting the lamps is a housing 31 having a transparent portion 31A for easy viewing. The lamp housing threadedly engages the battery housing 1 and is removable therefrom.

The method of using the device in measuring deviations in angular velocity of a turntable is as follows. The apparatus is placed on the turntable so that the recess 32 fits over the center post 33 of the turntable 5. The slider 12 bearing contacts 14 and 15 is moved to the inner extremity of its path on the threaded rod. The weight 23 is set at some point near the end of the swinging arm 4. The greater the degree of sensitivity desired, the closer to the end of the arm is the weight placed since at its extreme outward position the largest movement of the arm will be obtained for the smallest deviation in velocity.

The turntable is then set in operation and a little time is allowed for it to come up to its maximum speed. After coming up to maximum speed, the position of the pointer 24 is noted with relation to scale 25 on the end of the frame. Observation may be made with the aid of a stroboscopic light to stop the apparent motion. The observer may move around the turntable observing the pointer at all points in the circular path. If the motion is perfectly uniform, the pointer will remain at the center of the scale. If there is momentary binding at any point, inertia of the weight 23 will cause the weighted arm 4 to move forward a little with relation to its former position on the turntable. This motion will appear as movement of the pointer 24 across scale 25. Momentary speeding up at any point will cause lag in the motion of the arm 4 and this will appear as a movement of pointer 24 in the opposite direction. Both faults may be present in the same machine. By reading the position of pointer 24 on scale 25 the deviation may be quantitatively measured. Use of different size weights as well as positioning of the weight will vary the sensitivity. In this direct reading method, the sliding contacts 14 and 15 have no function except to limit the extent of the swing of arm 4. They could be omitted if desired since end guides can be placed on the scale.

Since it is difficult to get an accurate reading on a scale and pointer placed as above described, an alternate electrical reading method has been provided. In this case, the sliding contacts are again placed at the innermost end of their path of travel. The spacing of contacts 14 and 15 is set with relation to contact strips 19 and 20 such that if a contact is made when the turntable is in operation, the deviation in velocity is above a maximum acceptable value. The turntable is again set in operation and allowed to come up to maximum speed as before. If no contact is made between 14—19 or between 15—20, the slider is moved slowly outward along the threaded rod until contact is just made between one pair of contacts. Although the contacts are always the same distance apart, no matter what the position of the slider along the arm, it takes relatively less swinging movement of the arm 4 to make contact as the slider is moved toward the outer extremity of its path. Therefore, the position of the slider can be used as a measure of the deviation of the arm 4 and consequently of any deviation in angular velocity of the turntable.

When the arm swings and contact is made with one of the contact points 14 or 15, an electrical circuit is completed through the battery and one of the lamps 21 or 22, depending upon whether the swing has been forward or backward. The lamps may be different colors.

It is not necessary to stop the turntable every time the slider is to be moved to a new position. With the slider at its innermost position, the operator grasps the knurled sleeve 28, pushing the attached gear 27 downward into mesh with the gear 26 on the threaded rod, spring 30 providing the necessary tension. This causes the threaded rod to rotate and slider 12 to move outward.

The same device may also be used to measure wobble of the turntable in a plane at right angles to the plane of rotation. This is done by rotating the arm 4, with its weight and associated contacts, through an angle of 90°.

The electrical contact circuit is shown in Fig. 5. In this figure, the leads 34 and 35 connect lamps 21 and 22 to the contact strips 19 and 20, respectively, while the leads 36 and 37 represent the electrical connections of contact points 14 and 15, which points are connected to the negative side of battery 2 through the base members of frame 3 and raised contact plate 40. When the arm swings in the direction of arrow 38, contact is made through leads 35 and 37 and lamp 22 is illuminated. When the opposite pair of contacts is closed, by the arm swinging in the direction of arrow 39, the other lamp 21 is illuminated.

It is not necessary that the arm, itself, be flexible or have a flexible portion. A thin but rigid arm may be pivoted on bearings, preferably at or near the axis of rotation, if used with rotatable bodies, and normally held with light spring tension at its zero position.

Refinements can be made in the apparatus which can be used to magnify the swinging movement of the arm 4 and thereby increase the accuracy of reading. For example, a small mirror may be attached to the outer end of the arm, a beam of light from the central housing can be directed to the mirror and be reflected to a scale. Small movements of the mirror will result in large differences in readings on the scale. Also, the moving arm may be made one plate of a condenser and extent of movement may be measured by a change in the capacitance.

The apparatus may be also used to measure deviations in other types of motion, such as in a straight line. In this case, the flexible arm may be swung preferably in a plane substantially perpendicular to the direction of motion of the object.

There has thus been provided an improved method of measuring quantitatively deviations in the normal motion of a moving object, which method is simple in its application but accurate in results. There has also been presented apparatus which may be used in carrying out the method.

I claim as my invention:

1. In apparatus for measuring momentary deviation in the normal rotational velocity of a rotatable body, an arm having a flexible portion, said arm having a fixed end and another end free to swing in either of two angular directions lying in the same plane, means for mounting said arm on said body such that said fixed end is adjacent the axis of rotation of said body and such that said arm has a normal rest position with respect to a point on the plane of rotation of said body, contact means located so as to make contact with a point on said arm between said ends in response to deviation of the arm by a predetermined distance in either of said angular directions from said rest position, and means for positioning said contact means at any point along the longitudinal axis of said arm between said ends.

2. Apparatus according to claim 1 in which said contact means comprises a pair of contact elements positioned on opposing sides of said arm.

3. Apparatus according to claim 2 which includes electrical means for indicating when a contact has been made between said arm and a contact element.

4. Apparatus according to claim 1 including means for changing the position of said contact means along said longitudinal axis while said body and said arm are rotating.

5. In apparatus for measuring momentary deviations in the normal rotational velocity of a rotatable body, an arm having a flexible portion, said arm having a fixed end and an end free to swing, means for mounting said fixed end adjacent the axis of rotation of said rotatable body, and means positionable along said arm between said ends for indicating degree of deviation of said arm from a normal rest position during the rotation of said rotatable body.

6. Apparatus for measuring the direction and extent of momentary deviations in the normal rotational velocity of a phonograph record turntable comprising a frame adapted to rest on the surface of said turntable, an arm having a flexible portion, said arm having a fixed end and another end free to swing in either of two angular directions in a plane parallel to the plane of rotation of said turntable, means for mounting said arm on said frame such that said fixed end is adjacent the axis of rotation of said turntable and such that said arm has a normal rest position with respect to a point on said plane of rotation of the turntable, contact means positioned so as to make contact with a point on said arm between said ends in response to deviation of said arm by a predetermined distance in either of said angular directions from said rest position, and means for positioning said contact means at any point along the longitudinal axis of said arm between said ends.

7. Apparatus according to claim 6 including means for changing the position of said contact means along said longitudinal axis while the turntable is rotating.

GEORGE K. GRAHAM.

REFERENCES CITED

The following references are of record in the file of this patent:

UNITED STATES PATENTS

| Number | Name | Date |
|---|---|---|
| 1,520,008 | Buckle | Dec. 23, 1924 |
| 1,522,175 | Campbell | Jan. 6, 1925 |
| 2,193,707 | Baumann | Mar. 12, 1940 |
| 2,302,670 | Buchanan | Nov. 24, 1942 |
| 2,310,213 | Buchanan | Feb. 9, 1943 |
| 2,338,732 | Nosker | Jan. 11, 1944 |
| 2,359,245 | Ritzmann | Sept. 26, 1944 |
| 2,436,529 | Bressley | Feb. 24, 1948 |

FOREIGN PATENTS

| Number | Country | Date |
|---|---|---|
| 278,237 | Germany | Sept. 24, 1914 |